United States Patent
Jacoulot

(10) Patent No.: US 9,825,511 B2
(45) Date of Patent: Nov. 21, 2017

(54) METHOD FOR REPAIRING A STATOR

(71) Applicant: ALSTOM Technology Ltd, Baden (CH)

(72) Inventor: Pascal Lucien Jacoulot, Dorans (FR)

(73) Assignee: General Electric Technology GmbH, Baden (CH)

( * ) Notice: Subject to any disclaimer, the term of this patent is extended or adjusted under 35 U.S.C. 154(b) by 467 days.

(21) Appl. No.: 14/488,607

(22) Filed: Sep. 17, 2014

(65) Prior Publication Data
US 2015/0001986 A1    Jan. 1, 2015

Related U.S. Application Data

(63) Continuation of application No. PCT/EP2013/055717, filed on Mar. 19, 2013.

(30) Foreign Application Priority Data

Mar. 20, 2012 (EP) .................................... 12290097

(51) Int. Cl.
    *H02K 1/18* (2006.01)
    *H02K 15/00* (2006.01)
    *H02K 15/02* (2006.01)

(52) U.S. Cl.
    CPC ........... *H02K 15/0006* (2013.01); *H02K 1/18* (2013.01); *H02K 15/024* (2013.01); *Y10T 29/49009* (2015.01)

(58) Field of Classification Search
    CPC ............................ H02K 1/18; H02K 15/0006
    See application file for complete search history.

(56) References Cited

U.S. PATENT DOCUMENTS

| | | | | |
|---|---|---|---|---|
| 4,258,281 A | * | 3/1981 | Calfo | H02K 3/42 310/256 |
| 4,425,521 A | * | 1/1984 | Rosenberry, Jr. | H02K 3/493 174/DIG. 20 |
| 5,174,011 A | | 12/1992 | Weigelt | |
| 5,258,681 A | * | 11/1993 | Hibino | H02K 3/493 310/214 |
| 5,918,360 A | * | 7/1999 | Forbes | D06F 37/304 29/596 |
| 7,271,512 B2 | * | 9/2007 | Lee | D06F 37/304 310/216.105 |

(Continued)

FOREIGN PATENT DOCUMENTS

| | | |
|---|---|---|
| CN | 101978581 A | 2/2011 |
| EP | 0 913 912 A1 | 5/1999 |

(Continued)

OTHER PUBLICATIONS

Decision to Grant and Search issued in connection with corresponding RU Application No. 2014141894 dated Aug. 22, 2016 (See English Translation).

(Continued)

*Primary Examiner* — Dang Le
(74) *Attorney, Agent, or Firm* — GE Global Patent Operation; Rita D. Vacca

(57) ABSTRACT

The method for repairing a stator having a damaged part includes providing the stator with a seat, removing the damaged part of the stator, connecting the inserts replacing the damaged part of the stator to the seat, and fixing the inserts.

14 Claims, 6 Drawing Sheets

(56) References Cited

U.S. PATENT DOCUMENTS

2005/0172485 A1   8/2005   Mussen
2007/0169334 A1   7/2007   Matsuyama et al.
2009/0235516 A1   9/2009   Notarange et al.

FOREIGN PATENT DOCUMENTS

SU   1185504 A1   10/1985
SU   1511810 A1    9/1989

OTHER PUBLICATIONS

First Office Action and Search issued in connection with corresponding CN Application No. 201380015573.5 dated Sep. 5, 2016 (See English Translation).
Unofficial English translation of Office Action and Search Report issued in connection with corresponding CN Application No. 201380015573.5 dated May 25, 2017.

\* cited by examiner

METHOD FOR REPAIRING A STATOR

CROSS-REFERENCE TO RELATED APPLICATIONS

This application claims priority to PCT/EP2013/055717 filed Mar. 19, 2013, which claims priority to European application 12290097.0 filed Mar. 20, 2012, both of which are hereby incorporated in their entireties.

TECHNICAL FIELD

The present disclosure relates to a method for repairing a stator.

The stator is a part of a rotating electric machine such as a synchronous generator to be connected to a gas or steam turbine (turbogenerator) or a synchronous generator to be connected to a hydro turbine (hydro generator) or an asynchronous generator or a synchronous or asynchronous electric motor or also other types of electric machines.

BACKGROUND

Stators are made of a plurality of steel sheets slightly insulated from one another (laminated structure) and defining an annular shape with a stator bore into which the rotor is housed.

Axial slots open in the stator bore to house stator conductors. The stator conductors include a copper bar with an insulation that is very sensitive to the temperature, such that when the temperature increases above a predefined value, the insulation properties fall.

The laminated structure prevents eddy current circulation and thus generation of hot spots that, during operation, could damage the stator conductor insulation.

Thus, possible damages to the laminated structure that can cause two or more steel sheets to be short circuited must be removed. For example such damages can occur during maintenance operations when extracting the rotor from the stator bore or because a tool falls within the stator bore.

The stator has a central part with the stator bore that is substantially cylindrical, and end parts with the stator bore having a step conical shape.

When the step conical shaped end parts are damaged, the steel sheets of the damaged step conical shaped end part are un-stacked and then re-stacked (the damaged steel sheets are naturally replaced or repaired).

Un-stacking and re-stacking the steel sheets is very time consuming such that the time required for these operations could not fit into the conventional maintenance plan. For example time is required for the un-stacking and re-stacking operations, supplying the spare parts, execution of repairs.

SUMMARY

An aspect of the disclosure includes providing a method by which repairing of the end parts of the stator is fast. In particular, according to the disclosure repairing of the end parts of the stator is faster than un-stacking and re-stacking.

These and further aspects are attained by providing a method in accordance With the accompanying claims.

BRIEF DESCRIPTION OF THE DRAWINGS

Further characteristics and advantages will be more apparent from the description of a preferred but non-exclusive embodiment of the method, illustrated by way of non-limiting example in the accompanying drawings, in which.

DETAILED DESCRIPTION

Figure 1:
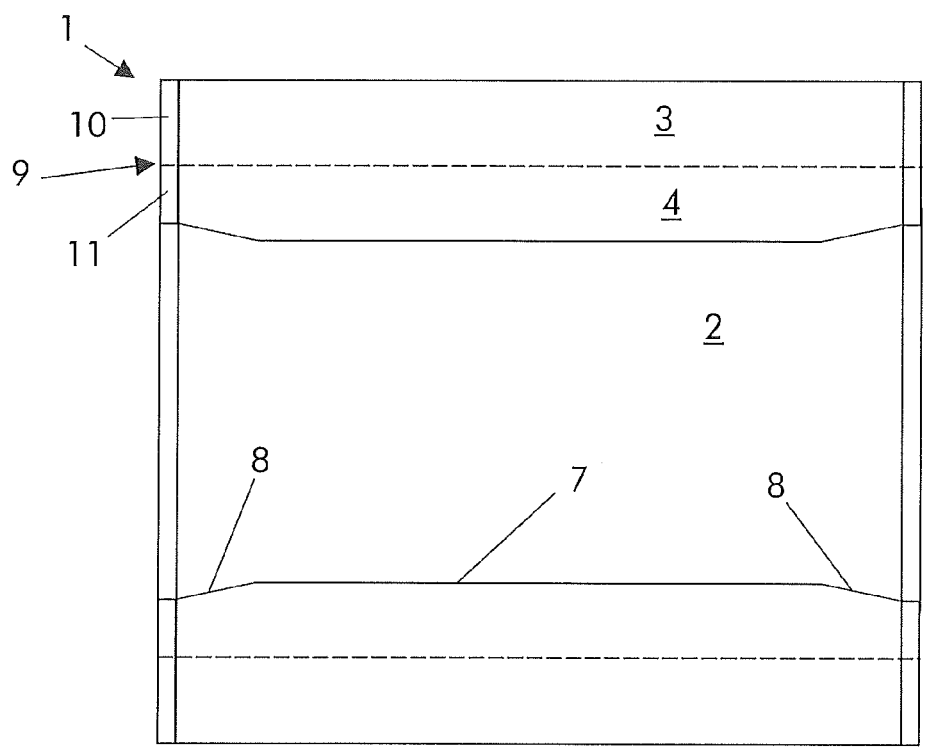
FIG. 1 is a schematic view of a stator.
Figure 2:
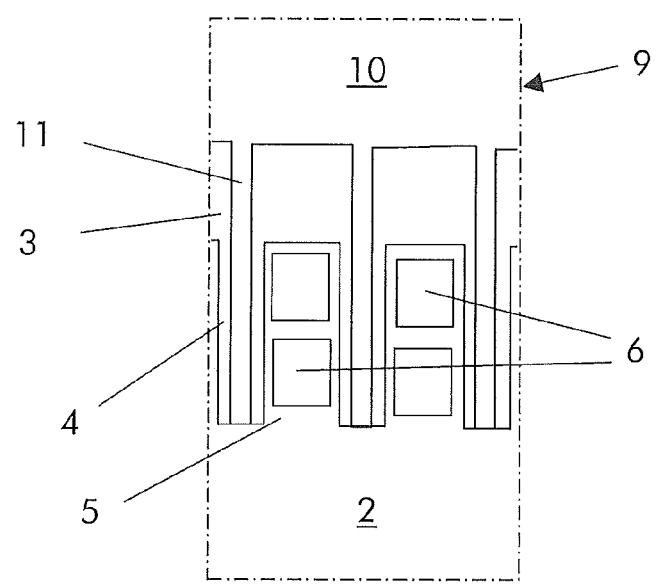
FIG. 2 is a schematic cross section of a part of FIG. 1.
Figure 3:
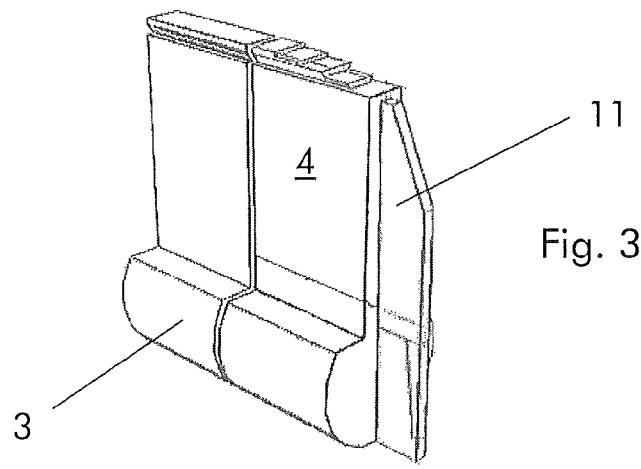
FIGS. 3 through 16 show the steps of the method.
Figure 4:
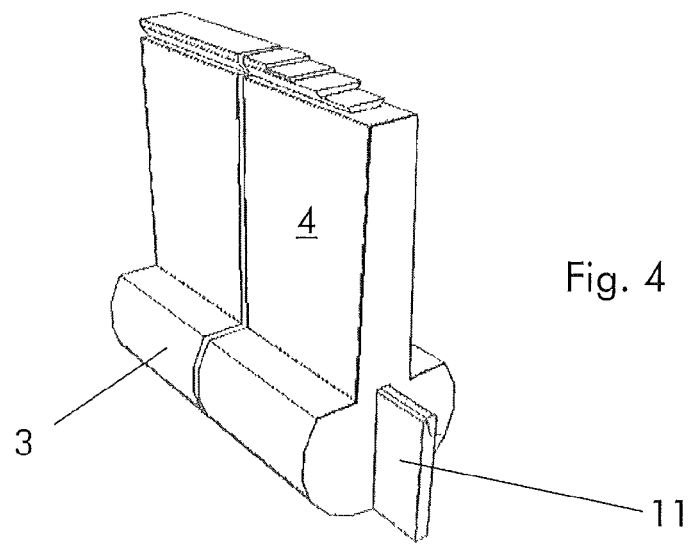

FIGS. 1 and 2 show a stator 1 comprising a plurality of steel sheets slightly insulated from one another. The stator 1 has a substantial cylindrical shape and defines a stator bore 2.

The stator 1 has an annular part 3 from which fingers 4 extend. The fingers 4 define slots 5 for the stator conductors 6.

The bore 2 has a substantially cylindrical central part 7 and conical end parts 8. The conical end parts 8 are step conical end parts (i.e. the conical surface has steps) because of the laminated structure of the stator).

At the ends of the stator 1 press plates 9 are provided.

Each press plate 9 has a substantially annular part 10 resting on the annular part 3 of the stator 1, and fingers 11 extending from the annular part 10 and resting on the fingers 4 of the stator 1.

During manufacturing or more often during maintenance operations the surface of the stator bore 2 could be damaged.

For example during maintenance operation it is often required extraction of the rotor from the stator bore 2; this is done by sliding the rotor (connected to supports) out of the stator bore 2. If during extraction the rotor contacts the stator (for example it falls from a support) it can damage the stator. In other examples, the stator could be damaged during maintenance operation in case a tool falls within the stator bore 2.

In these cases, when the damage is at the end parts 8 of the stator 1, the method of the disclosure can be implemented.

Before the method is implemented the whole stator can be checked, in order to find the stator zones that must be repaired.

Thus a part of the press plate 9 (typically the finger 11 or a portion thereof) is preferably removed.

Figure 5:
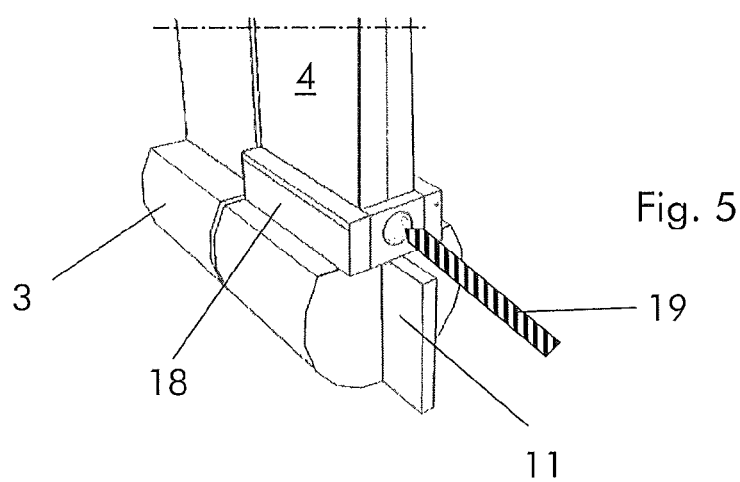
Figure 9:
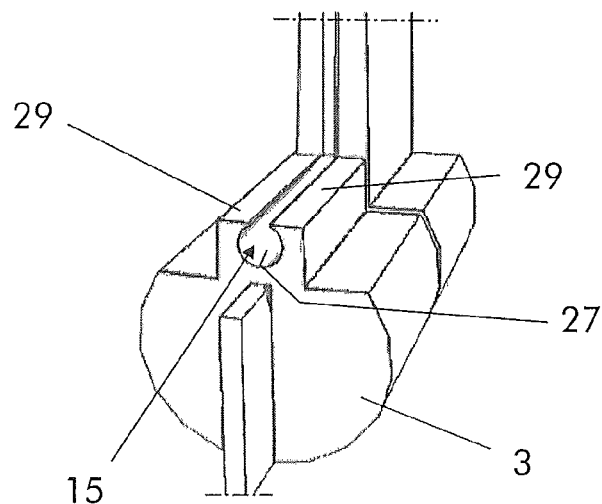
Figure 10:
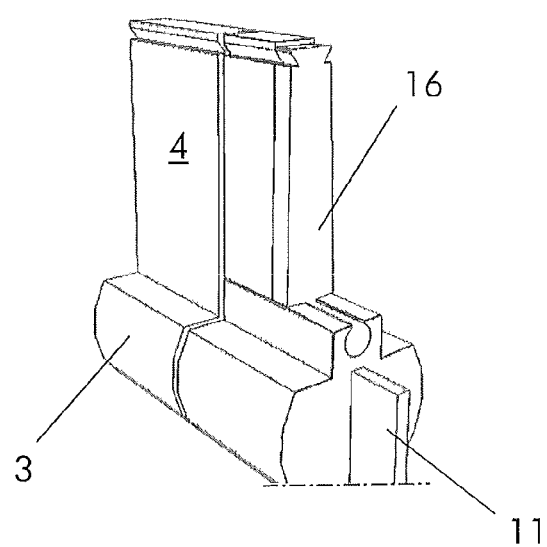
Figure 11:
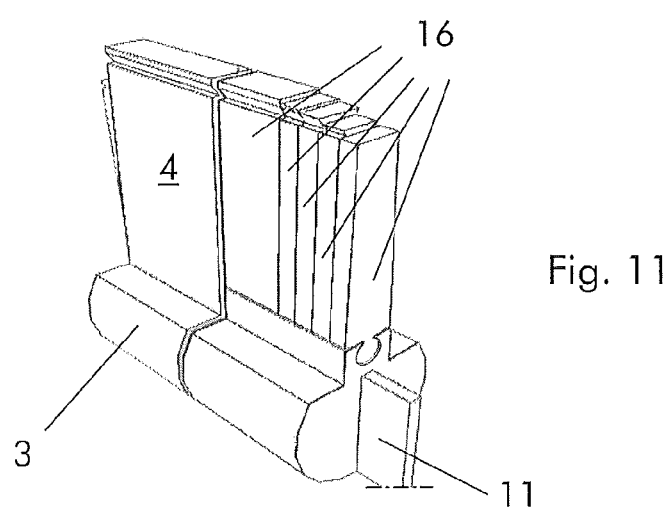
Figure 12:
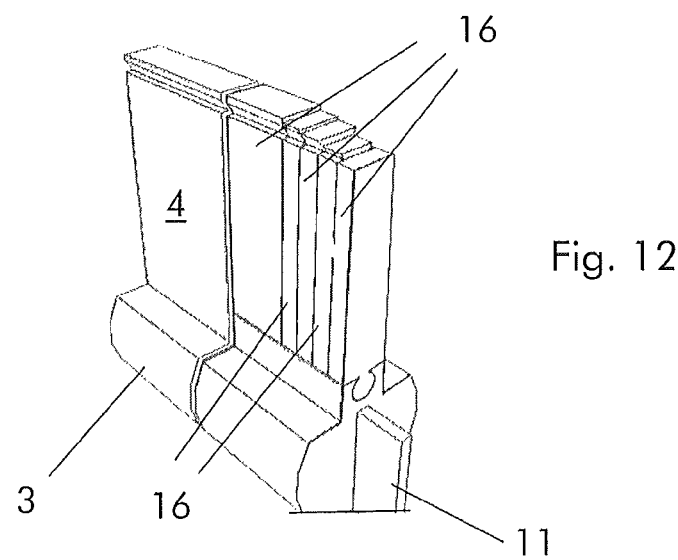
Figure 14:
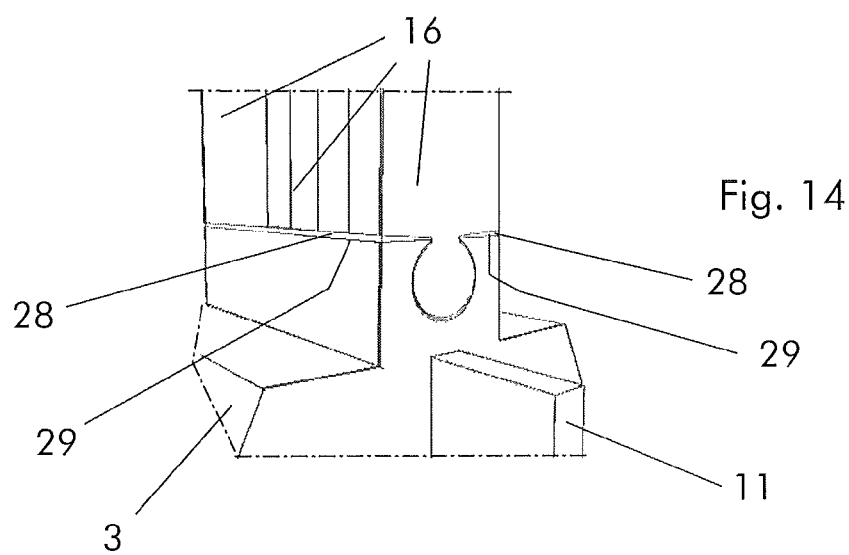
Figure 15:
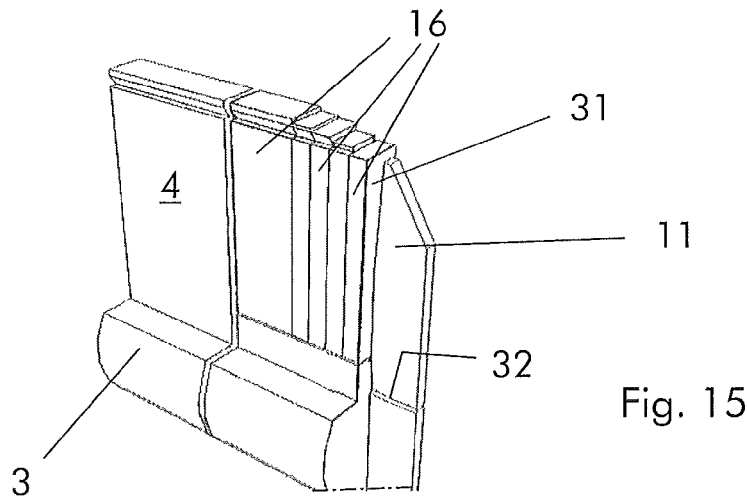
Figure 16:
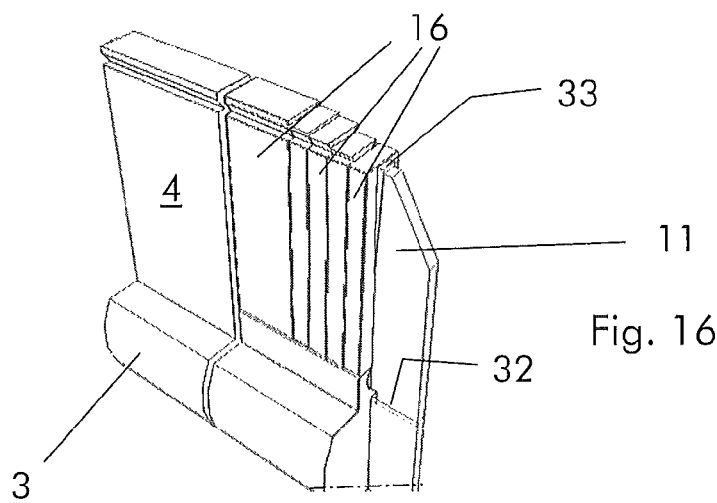
Figure 17:
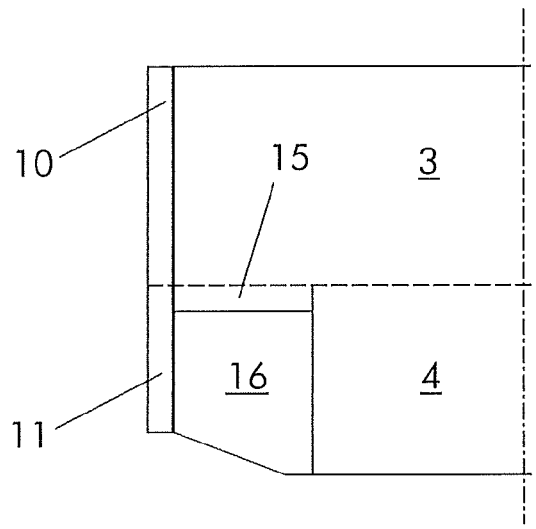
FIG. 17 is a schematic cross section of a particular of a repaired stator.

Then the damaged end parts of the stator 1 are repaired by providing the stator 1 with a seat 15 (FIGS. 5 and 9) for at least an insert, removing the damaged part of the stator (FIGS. 6 and 7), and connecting at least an insert 16 replacing the damaged part of the stator to the seat 15 (FIGS. 10 through 12), and then fixing the insert 16 (FIG. 14 through 16).

Providing the seat 15 includes drilling a hole in the stator 1 (FIG. 5); when drilling a drilling template 18 can be used to guide the drill 19 and guarantee precision. For the same reason (i.e. precision) the drilling machine can be fixed to the stator when drilling.

Drilling is preferably carried out at a finger 4.

Figure 6:
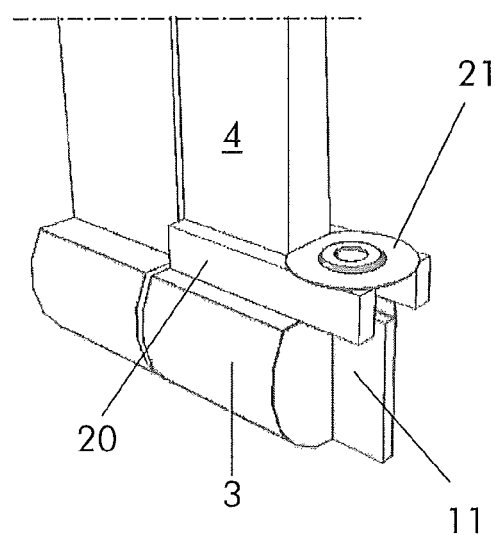

After drilling the drilling template 18 is removed and a saw template 20 is connected to the stator 1 (at the position that was drilled, FIG. 6).

Figure 7:
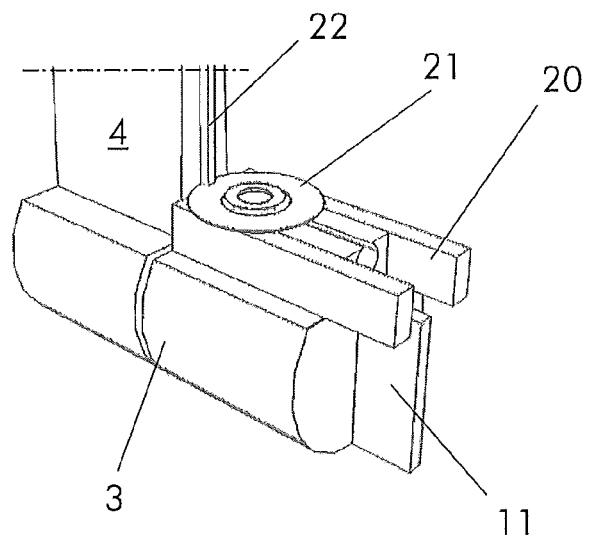

Removing the damaged part of the stator 1 includes opening the seat 15 towards the stator bore 2 (FIGS. 6, 7). This can be done using a saw 21 and the sow template 20 to cut the fingers 4 for the length required. FIG. 7 shows the saw 21 at the end of the cut, when it faces a spacer 22 defining cooling channels for the stator.

Figure 8:
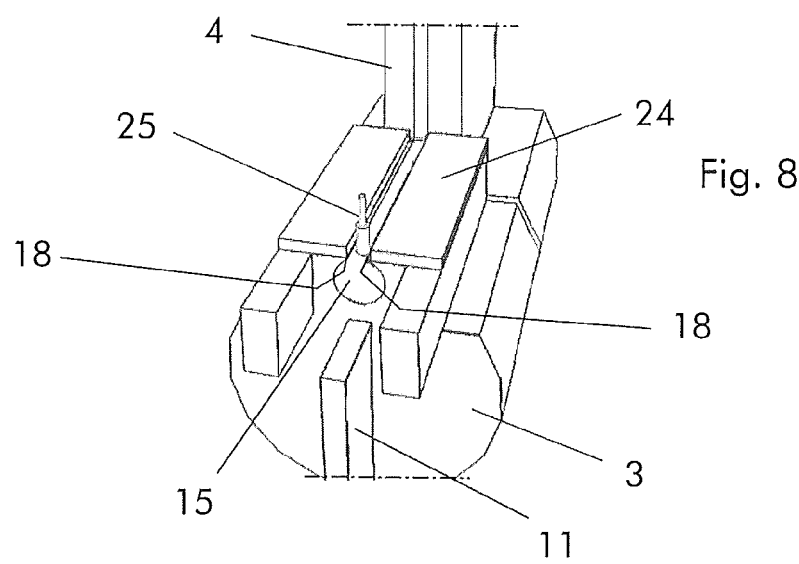

After sawing the saw template 20 is removed and a grinding or milling template 24 is connected to the stator 1, at the position that was sawn (FIG. 8).

With the help of the grinding or milling template 24 and a grinding or milling tool 25 (the milling tool is shown in FIG. 8) the seat side borders 18 delimiting the seat 15 from the stator bore 2 are shaped.

Shaping includes making the seat borders 18 substantially radial and preferably removing the sharp angles (FIG. 8).

Then possible burs are removed, for example by milling or acid methods and flux text are carried out, to control the insulation between adjacent steel sheets and control that the whole damaged part has been removed.

Thus insulation 27 is applied into the seat 15 (FIG. 9); this is done before the insert 16 is connected to the seat 15. For example an insulating resin can be provided into the seat 15.

Then the inserts 16 are connected to the seat 15.

The inserts 16 are preferably made of a plurality of steel sheet slightly insulated from one another (i.e. they have a laminated structure like the stator); the steel sheets of the inserts 16 can be the same as (i.e. can have the same geometrical and/or electrical and/or mechanical and/or thermal features) or can be different from the sheets used to manufacture the stator 1. The laminated structure of the insert 16 helps damping of the magnetic flux at the stepped part of the stator and preventing overheating that could occur if the insert 16 is made of an insulating material.

Once the inserts 16 are connected to the seat 15 (FIGS. 10-12), they are aligned to the fingers 4 of the stator 1 before they are fixed to the stator 1.

Figure 13:
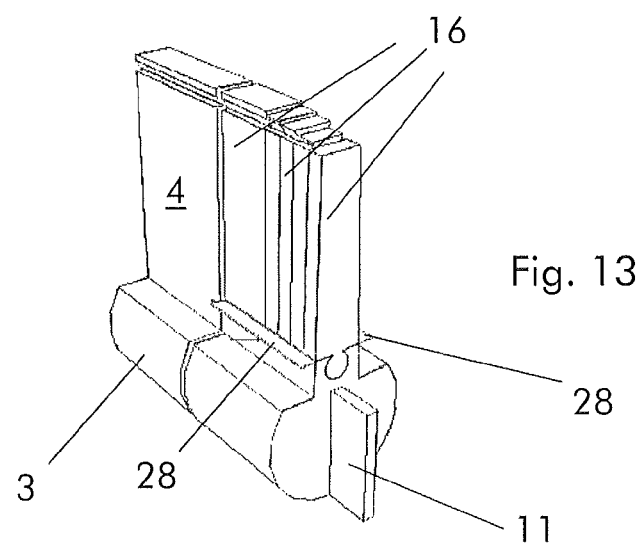

Fixing the inserts 16 includes providing wedges 28 between external borders 29 of the seat 15 and the inserts 16. As shown the wedges 28 can have dimensions larger than the final required dimensions (FIG. 13) and can be cut to meet the required dimensions (FIG. 14).

Then an insulating sheet 31 resting on the last insert 16 is provided and the removed part of the press plate (for example the finger 11) is reconnected to the press plate 9 (for example it is welded at 32).

Then a wedge 33 is provided between the last insert 16 and the reconnected part (for example finger 11) of the press plate 9.

The stator 1 after repair has at one or both of its end parts one or more seats 15 for at least an insert 16, and the insert 16 within the seat 15.

Naturally the features described may be independently provided from one another.

In practice the materials used and the dimensions can be chosen at will according to requirements and to the state of the art.

The invention claimed is:

1. A method for repairing a stator having a damaged end part; the method comprising:
    providing a seat in the stator adjacent the damaged end part, the seat comprising an open-sided channel, a widest point width of the open-sided channel perpendicular to the longitudinal axis of the open-sided channel greater than a width of an open side of the open-sided channel perpendicular to the longitudinal axis of the open-sided channel;
    removing the damaged part of the stator;
    connecting to the seat via an extended portion dimensioned for interlocking fit within the open side and within the open-sided channel at least an insert comprising a plurality of individually insulated laminated sheets replacing the removed damaged part of the stator; and
    fixing the insert to the stator.

2. The method of claim 1, wherein providing the seat includes drilling a hole in the stator to form the open-sided channel.

3. The method of claim 1, wherein the stator has a stator bore, wherein removing the damaged part of the stator includes opening the seat towards the stator bore.

4. The method of claim 3, further comprising shaping seat side borders delimiting the seat from the stator bore.

5. The method of claim 4, wherein shaping includes making the seat side borders substantially radial.

6. The method of claim 1, wherein the stator has an annular structure with fingers defining slots for housing stator conductors, wherein removing the damaged part of the stator includes cutting at least a part of at least a finger.

7. The method of claim 1, further comprising applying insulation into the seat before connecting the insert to the seat.

8. The method of claim 1, further comprising aligning the insert to fingers of the stator before fixing the insert to the stator.

9. The method of claim 1, wherein fixing the insert to the stator includes providing at least a wedge between external borders of the seat and the insert.

10. The method of claim 1, wherein removing the damaged part of the stator includes removing a part of a press plate, and fixing the insert to the stator includes reconnecting the removed part of the press plate to the stator.

11. The method of claim 10, wherein fixing the insert to the rotor includes providing at least a wedge between the insert and the reconnected part of the press plate.

12. The method of claim 1, wherein the insert may differ geometrically, electrically, mechanically or thermally from the stator.

13. A stator comprising:
    at least one end part of the stator;
    at least a seat in the at least one end part, the at least a seat comprising an open-sided channel, a widest point width of the open-sided channel perpendicular to the longitudinal axis of the open-sided channel greater than a width of an open side of the open-sided channel perpendicular to the longitudinal axis of the open-sided channel;
    a void in the at least one end part adjacent the at least a seat; and
    an insert arranged in the void comprising a plurality of individually insulated laminated sheets connected to the at least a seat via extended portions dimensioned for interlocking fit within the open side and within the open-sided channel, aligned to fingers of the stator, and fixed to the stator with a press plate.

14. The stator of claim 13, wherein the at least a seat is insulated.

* * * * *